United States Patent [19]

Hardy

[11] Patent Number: 4,679,768
[45] Date of Patent: Jul. 14, 1987

[54] VALVE

[75] Inventor: Derrick Hardy, Lowdham, England

[73] Assignee: Bercorit & Herweg Limited, Arnold, England

[21] Appl. No.: 756,232

[22] Filed: Jul. 18, 1985

[30] Foreign Application Priority Data

Jul. 18, 1984 [GB] United Kingdom ............. 8418349

[51] Int. Cl.[4] .................................... F16K 25/00
[52] U.S. Cl. ................... 251/159; 251/167; 251/251; 251/302
[58] Field of Search ........... 251/159, 167, 301, 302, 251/251

[56] References Cited

U.S. PATENT DOCUMENTS

| 1,692,496 | 11/1928 | Fröb | 251/167 |
| 3,109,457 | 11/1963 | Oliveau | 251/159 |
| 3,249,117 | 5/1966 | Edwarde | 251/302 |
| 3,557,822 | 1/1971 | Chronister | 251/159 |
| 3,904,171 | 9/1975 | Chronister et al. | 251/159 |
| 4,509,717 | 4/1985 | Wright et al. | 251/159 |

Primary Examiner—Alan Cohan
Assistant Examiner—Sheri M. Novack
Attorney, Agent, or Firm—Spencer & Frank

[57] ABSTRACT

A valve for connection in a pipeline or duct for the conveyance of a fluent medium includes a valve plate which is movable laterally relative to the duct between respective open and closed positions, with resilient sealing means provided on or in association with the valve plate. The sealing means is provided on an axially movable member to engage one face of the valve plate, while the opposed sealing means is carried by a fixed end member so that the valve plate is clamped between them. Either of the sealing means may be omitted. A ram actuates the valve plate by rotation of a shaft while simultaneously rotating a control ring forming part of the control mechanism which moves the member axially to clamp and release the valve plate.

7 Claims, 9 Drawing Figures

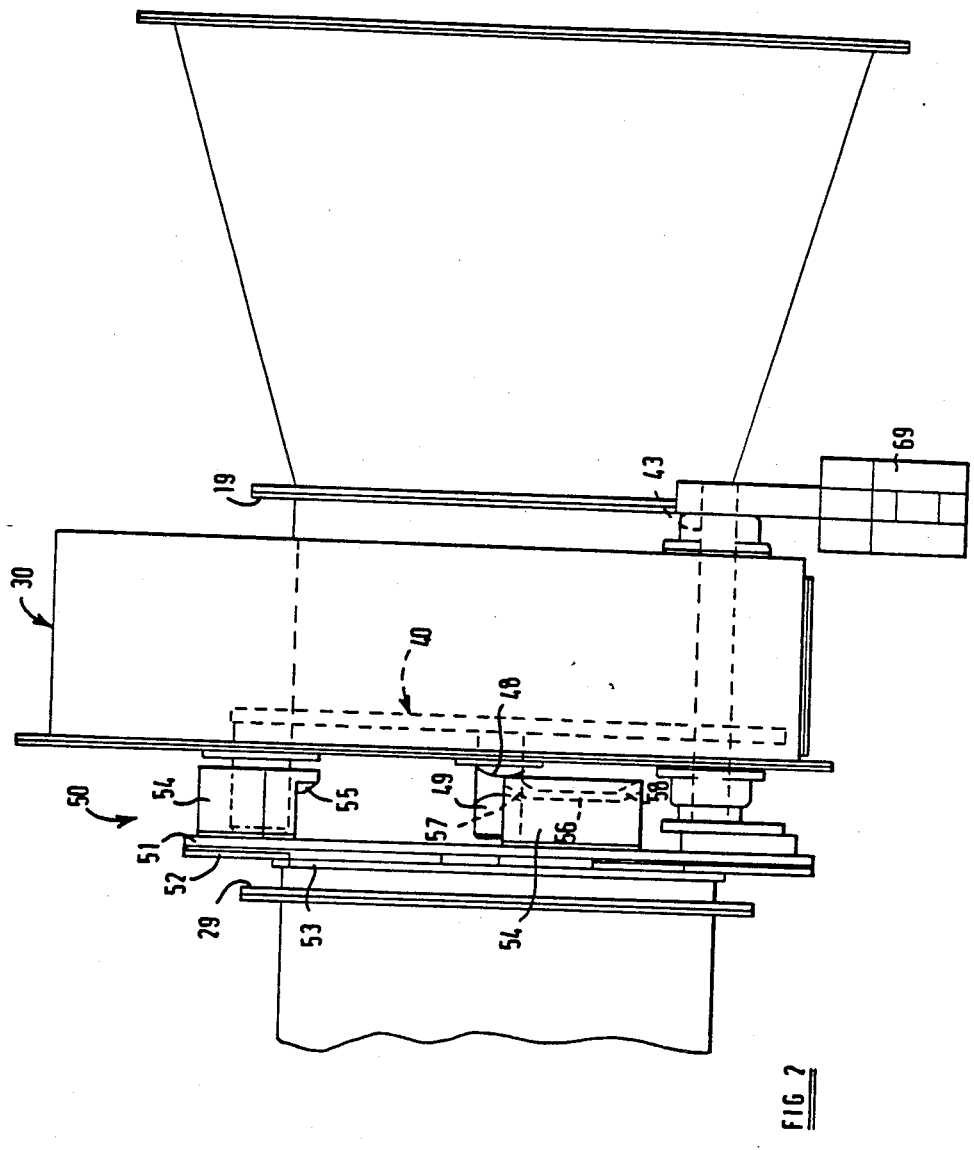

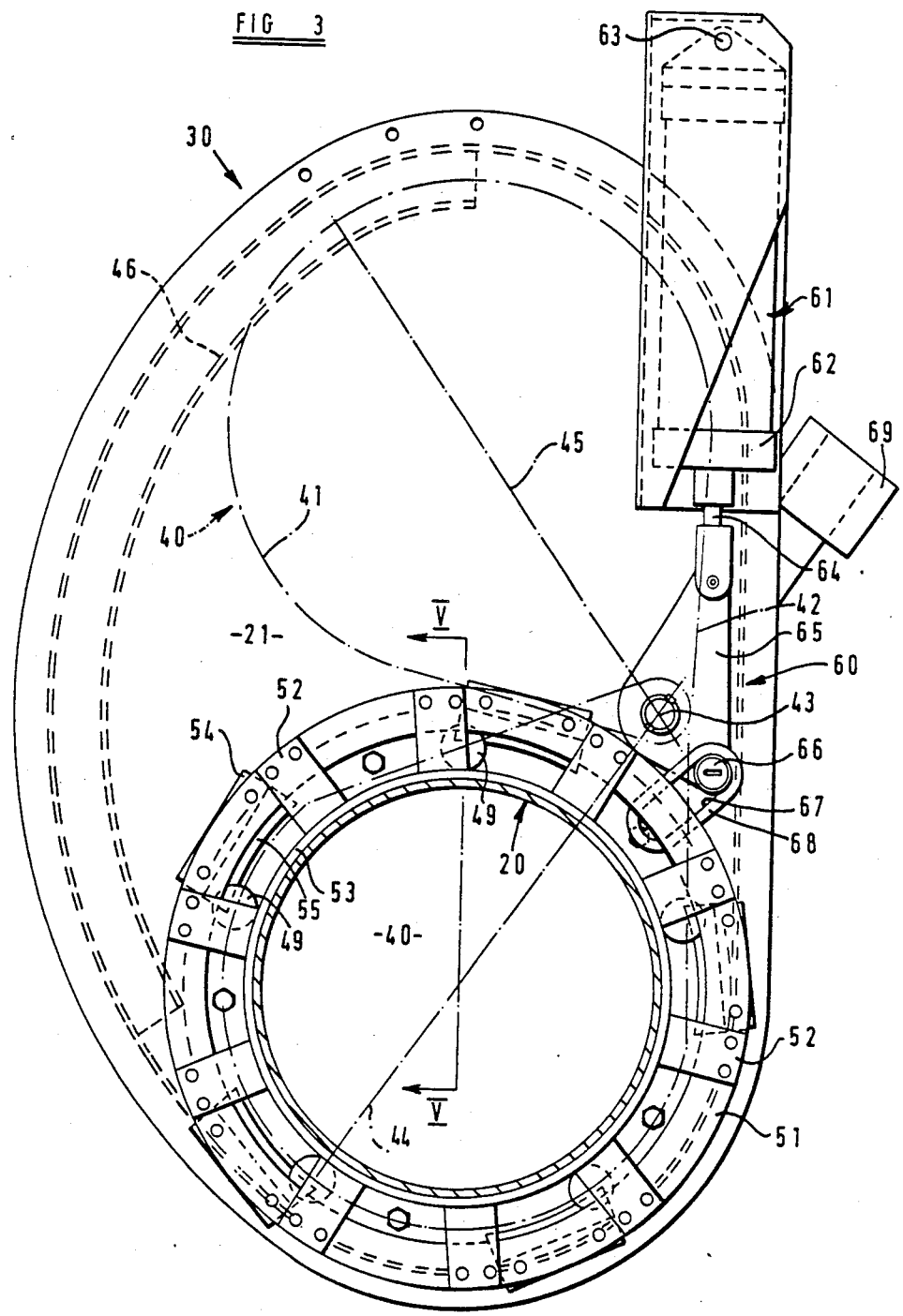

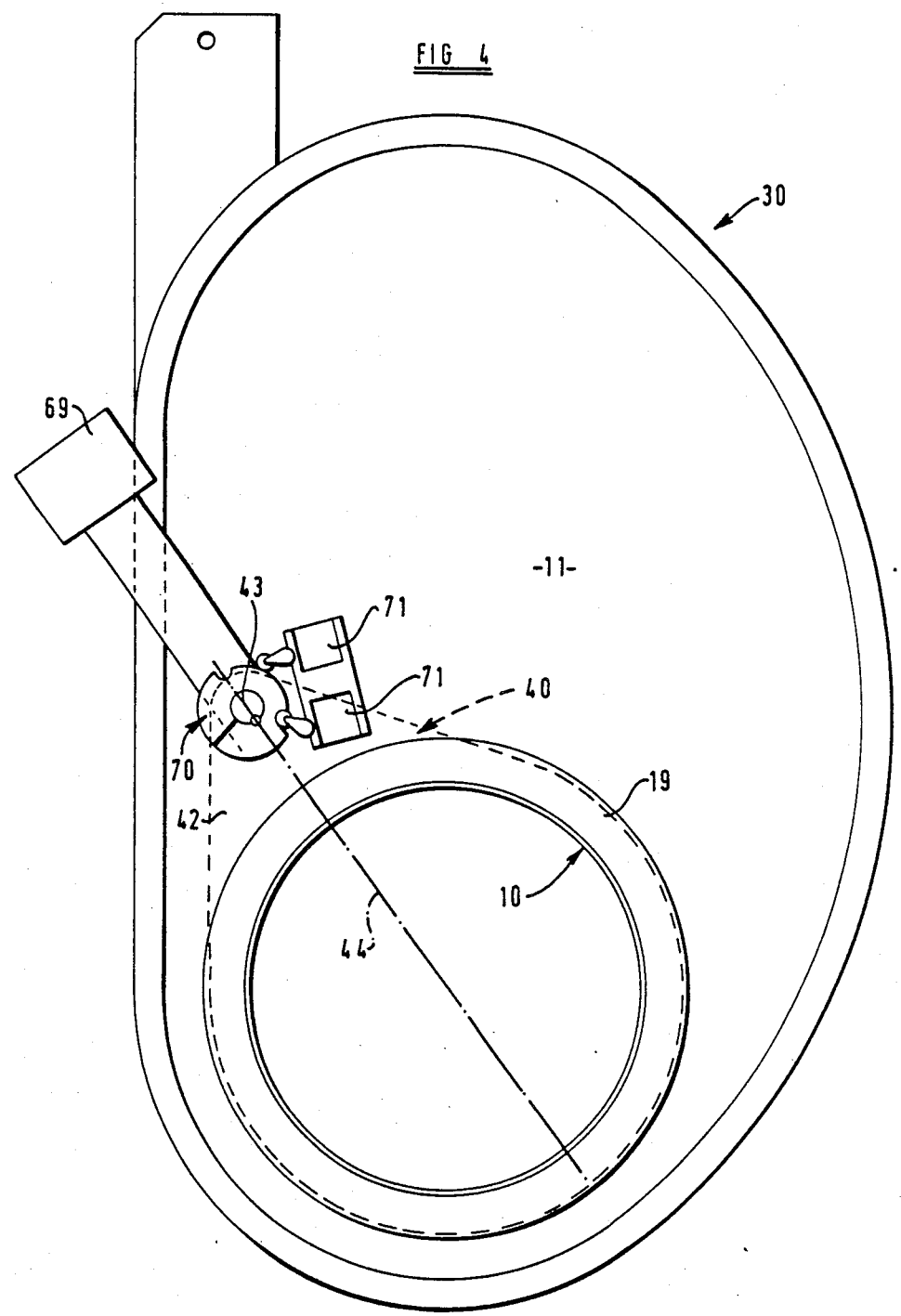

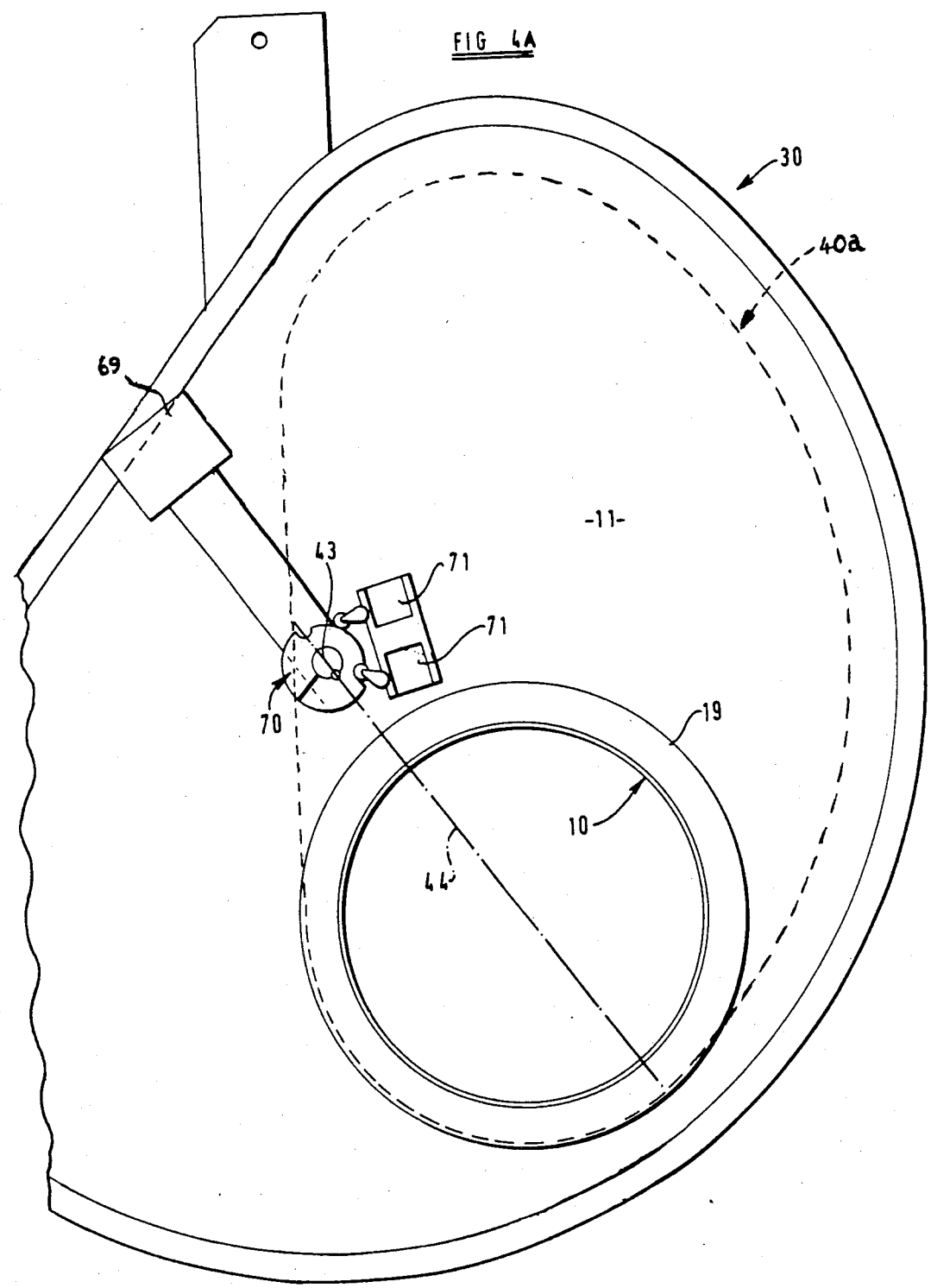

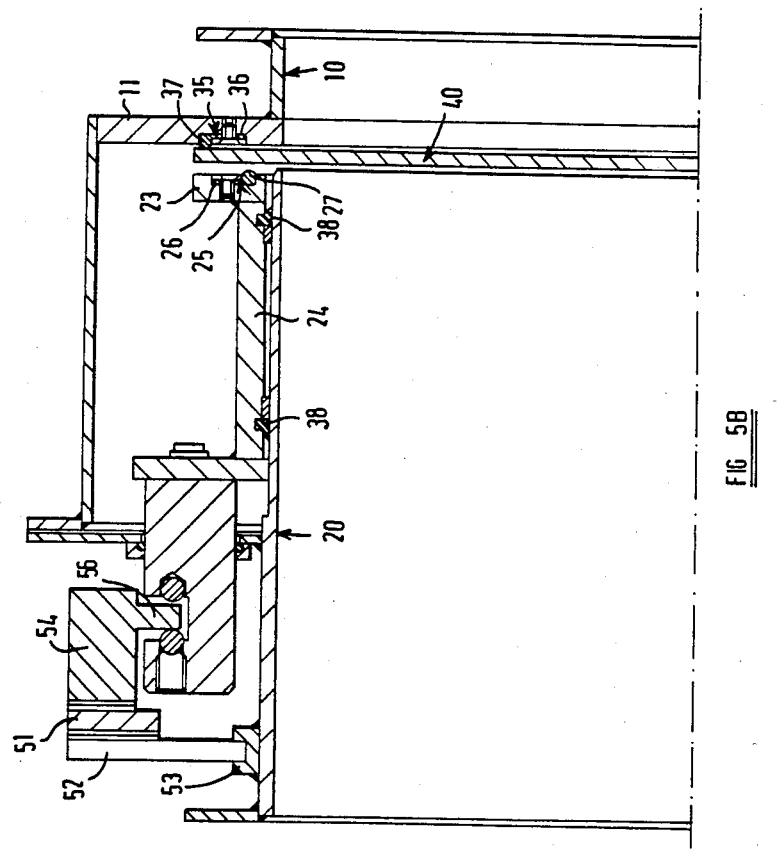

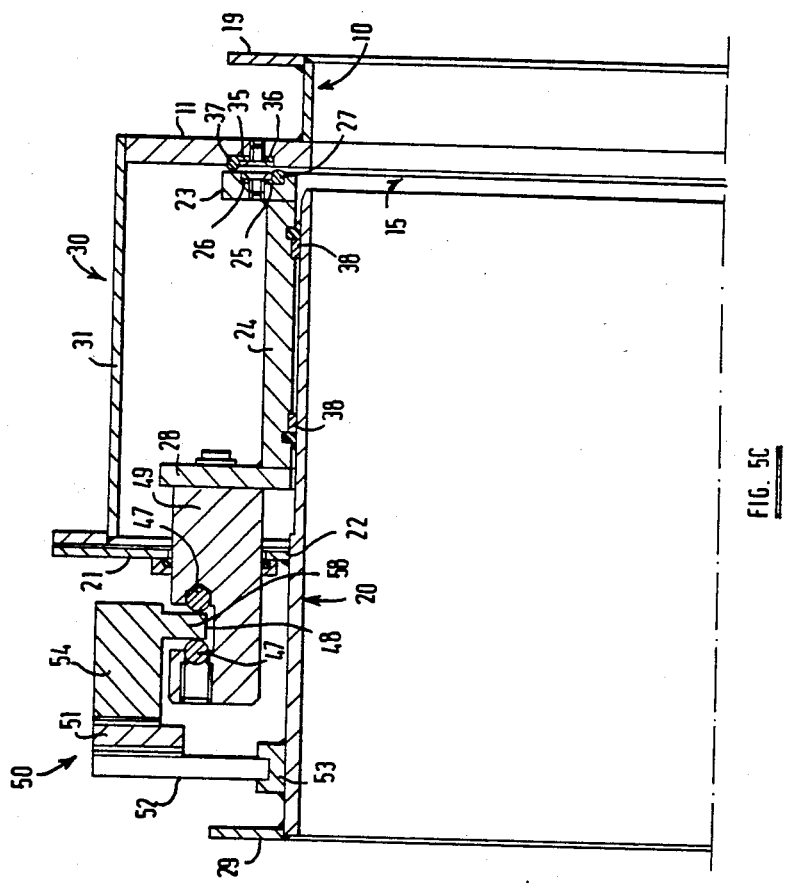

VALVE

BACKGROUND OF THE INVENTION

This invention relates to a valve for controlling the passage of air, gas, a fluent medium (such as air carrying solid particulate material, liquid or a flowable particulate solid) along a duct or through an opening. Such valves are hereinafter referred to as being for the purpose specified.

The invention relates more particularly to isolating valves, sometimes referred to as dampers, for use primarily although not exclusively in pipes through which pulverised fuel is blown. The mixture of pulverised fuel and air presents a potential explosion hazard and thus isolating valves used in such pipe lines must be robust and provide a good seal. However, similar valves may be employed in pipe-lines carrying fluids in general (both gaseous and liquid) and solids in a flowable condition, whether entrained in a fluid or not.

Valves currently used for such purposes are of two main types, generally referred to as plate-type and goggle-type.

Plate-type valves consist of a plate or blade which is movable into and out of an aperture in a frame set across the pipe, the blade mating with the frame to form a seal. The blade movement is generally linear, and the seal efficiency generally relies on the machining tolerances of the component parts.

Goggle-type valves also have a blade sliding in a frame, but of a size such that throughout its range of movement it always registers with the pipe, the plate having an eccentrically situated hole approximately commensurate with the cross-section of the pipe. In the "open" position, the hole is in register with the pipe and in the "closed" position the hole is moved laterally away from the pipe so that the remainder of the blade isolates the pipe sections on either side. In both positions, the clearances between the goggle plate and the fixed frame have to be sealed. Sealing is in some cases effected by means of spring loaded sealing rings which maintain contact with the blade throughout its movement, but this causes wear to occur, and increased tractive effort is required to move the blade. In other cases, sealing is effected by rigid seatings afforded by manually or automatically moved duct flanges which are slackened to permit movement of the goggle plate and tightened again when the plate is in either of the two terminal positions. If this is done manually, much plant time can be wasted, whilst the provision of a second mechanical actuator to perform the tightening function adds significantly to the cost of the valve and also to the cost of any sequencing circuitry for automatic operation.

A third type of valve sometimes used operates on a rather different principle and requires a seating within the cross-section of the pipe and a closure member which is movable both in a lateral direction to bring it into or out of alignment with the seating, and also in an axial direction to bring it into or out of sealing engagement with the seating. This design has the disadvantage that the seating can obstruct smooth flow within the pipe and the operating mechanism is complicated because of the two-stage movement required, particularly since the axial movement has to be effected by operating means disposed within the duct and thereby subject to the material carried thereby.

SUMMARY OF THE INVENTION

The object of the present invention is to provide an improved valve for the purpose specified and according to the invention, we provide a valve comprising a plate which is movable laterally with respect to a duct section defined by the valve between respective open and closed positions, wherein resilient sealing means are provided on or in association with the plate and either said plate or said sealing means is movable in the axial direction relative to the duct to form a peripheral seal which is effective between the plate and the duct.

In one preferred arrangement the sealing means engages opposed faces of the plate so as to clamp the plate and form peripheral seals with both faces when the plate is in its closed position. Alternatively the sealing means may engage the plate on only one face. In this case the plate may be clamped between the sealing means on one face and a fixed abutment on the other face. In both cases the sealing means may be effective when the plate is in its open position to form a peripheral seal around the duct.

According to the invention we further provide a valve comprising a plate which is movable laterally with respect to a duct section defined by the valve and means acting to clamp the plate at a position externally of the duct section and form a resilient seal which is effective between the plate and the duct section on at least one face of the plate.

The valve plate may be of the goggle-type and movable between open and closed positions with respect to an aperture defined by two axially spaced frame members in combination, with the clamping means being arranged to engage opposite faces of the plate in both its positions of opening and of closure. Alternatively the valve plate may be of the type which is movable into and out of such an aperture in which case the clamping means may engage the plate only in its position of closure.

More particularly, we provide a valve comprising a valve plate which is movable between open and closed positions with respect to an aperture defined by two axially spaced frame members in combination, wherein at least one of said frame members carries resilient sealing means arranged to engage with said valve plate and at least one of said frame members is movable towards and away from the other of said frame members in a direction transverse to the direction of movement of the valve plate.

The sealing means may be arranged to engage selectively with either the other of said frame members or with the valve plate according to the position of the latter, or where the valve plate is of the goggle-type the sealing means may engage with the valve plate in both its positions of opening and of closure.

In a preferred arrangement, both of said frame members carry resilient sealing means so that when in use in a duct in which the valve is connected the duct is sealed on both sides of the valve plate when such plate is in its closed position. However, for some applications it may be sufficient for only one of the frame members to carry such sealing means.

Preferably, in accordance with a particular aspect of the invention a single operating means is provided to control and synchronise both the lateral and the axial movements required, e.g. movement of the valve plate and the movable frame member. Such operating means may include an actuating member having a first range of movement which moves the valve plate between said open and closed positions and at least one further range of movement beyond said first range which moves said movable frame plate without further movement of said valve plate.

The invention is applicable particularly to valves of the plate and goggle plate types mentioned above since the axially movable seal obviates the disadvantages specified. However, the invention in its broadest aspect is also applicable to the third type of valve mentioned above with advantage.

BRIEF DESCRIPTION OF THE DRAWINGS

Various features of the invention will now be described in more detail, with reference to the accompanying drawings wherein:

FIG. 2 shows a top plan view corresponding to FIG. 1;

FIG. 3 shows a transverse section on the line III—III of FIG. 1;

FIG. 4 shows an end elevation of the valve in the direction of arrow IV of FIG. 1;

FIG. 4A shows a modification of FIG. 4, with a different type of valve plate;

DESCRIPTION OF THE PREFERRED EMBODIMENT

Figure 1:
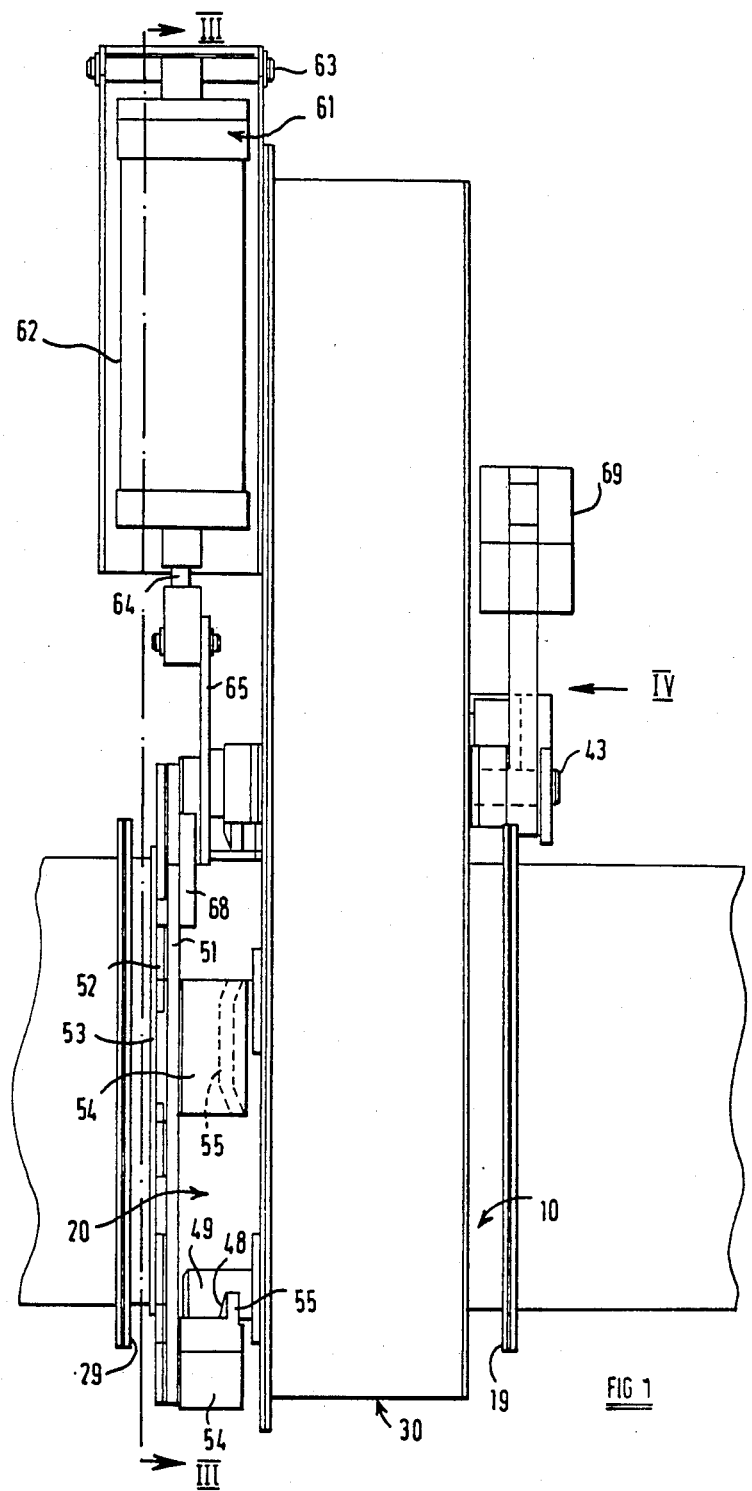
FIG. 1 shows one embodiment of valve in accordance with the invention in side elevation as installed in a duct.

As illustrated in FIGS. 1 to 5, a preferred embodiment of valve in accordance with the invention includes a duct component comprising two aligned duct sections 10 and 20 which define a tubular aperture for the passage of a fluent medium. The sections 10, 20 include end flanges 19, 29 whereby they may be connected in a pipeline or a duct of corresponding dimensions or, for example, between the outlet of a hopper and a pipeline.

The two duct section 10, 20 are arranged, as shown, with an axial spacing between them to afford a gap 15 for the accommodation of a valve plate 40 as hereinafter described. The two sections are connected together by means of a housing 30 which comprises an end plate 11 affording an aperture 12 of dimensions corresponding to the duct, an opposite end plate 21 affording an aperture 22 for the receiption of the duct section 20, and a peripheral casing 31 which extends axially between the end plates 11, 21. The end plate 11 is secured to the duct section 10 immediately adjacent to the gap 15, whilst the end plate 21 is secured to the duct section 20 at a position intermediate the ends thereof, as seen most clearly in FIG. 5.

The end plate 11 carries on its interior face a seal 35 which extends externally around the duct defined by sections 10 and 20. The seal 35 includes a flat portion 36 whereby it is secured to the plate 11, and a protruding bead 37 arranged to have sealing contact with the valve plate 40 as hereinafter described.

The end plate 11 serves as a frame member which encircles the duct for the purpose of carrying the seal 35, and whilst it is particularly convenient for the end plate 11 to serve as such frame member, it will be appreciated that it would alternatively be possible for a separate frame member to be carried by the duct section 10 or the end plate 11 for the purpose of supporting the seal 35.

A further frame member is afforded by an annular flange 23 carried by a sleeve 24 which is slidably mounted on the duct section 20. The annular flange 23 carries a seal 25 which includes a flat portion 26 whereby it is mounted on the flange and a protruding bead 27.

As illustrated, each frame member carries a single sealing ring which is of continuous annular form and may be made of suitable resilient material secured in position by local retaining means such as screws. As shown, the beads 27 and 37 are arranged at a different radius from the centreline of the duct so as not to register with one another. However, they may be arranged in register with one another. Further, either or both of the frame members may carry one or more additional sealing rings concentric with those illustrated.

Axial movement of the sleeve 24 enables the valve plate 40 to be clamped between the seals 25 and 35, at least when in its position of closure with respect to the duct, or released for movement between its position of closure and an open position as hereinafter described.

Axial movement of the sleeve 24 is facilitated by the provision of two wipe seals 38 which engage the exterior surface of the duct section 20.

To enable the sleeve 24 to be moved axially, it carries an annular flange 28 at the end thereof opposite to the flange 23 which carries the seal 25, and a control mechanism 50 is arranged to act between the flange 28 and the duct section 20.

The control mechanism includes a ring 51 which encircles the duct section 20 and is spaced outwardly therefrom. The ring 51 carries on one face thereof a plurality of inwardly projecting plates 52 which engage at their inner ends in a channel section, annular track 53. In this way, the ring 51 is movable circumferentially relative to the duct section 20.

On its opposite face, the ring 51 carries a plurality of blocks 54 which each afford a shaped flange 55 which is directed inwardly towards the duct section 20, in spaced relation to the ring 51.

Each flange 55 includes a central portion 56 extending in a plane parallel to that of the ring 51 and end portions 57 and 58 which incline in a direction away from the ring 51, as most clearly seen in FIG. 2. The radially inwardly directed face 59 of each flange 55 is of curved form, the centre of curvature being coincident with the centreline of the duct defined by the duct section 20.

The flanges 55 serve as cams which co-operate with cam followers in the form of axially directed posts 49 carried by the annular flange 28 and protruding through apertures in the end plate 21 of the housing, with suitable sealing arrangements as shown. Each post is formed with a radially outwardly directed slot 48, into which a respective flange 55 projects. Ball bearings 47 are provided on opposite sides of the slot to engage opposite faces of the corresponding flange 55.

Figure 5A:
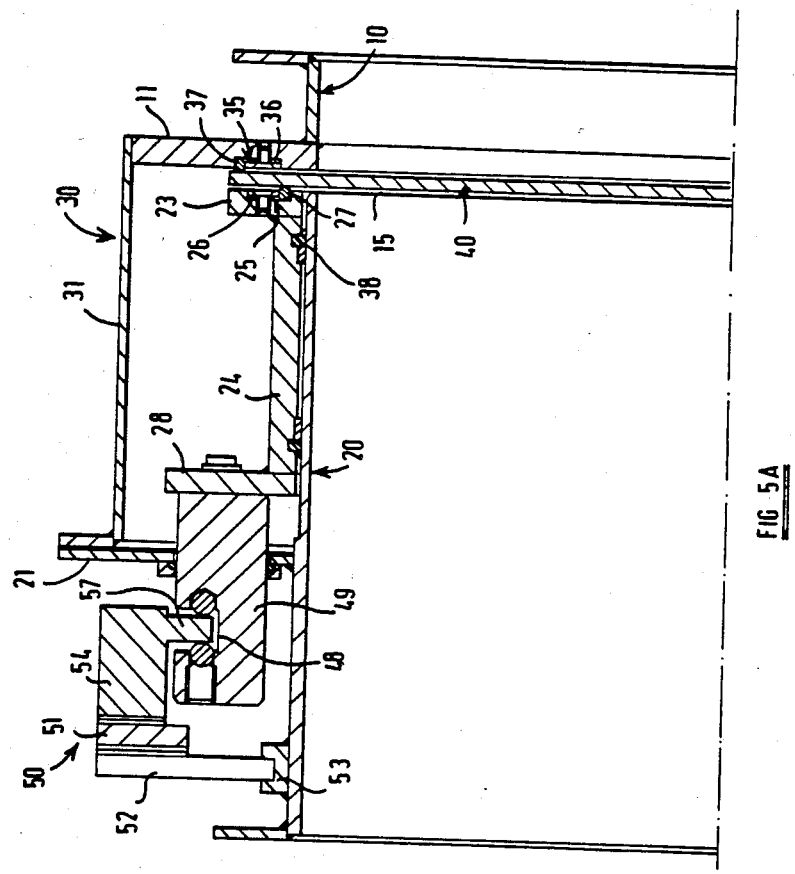
FIGS. 5a, b and c show a detailed fragmentary sectional view on a larger scale on the line V—V of FIG. 3 with the valve plate respectively in the closed position, an intermediate position, and the open position.

In operation, the ring 51 is rotatable by means hereinafter described between one extreme position in which the end portion 57 of each flange is located in the slot 48 of the corresponding post and another extreme position in which the other end portion 58 of the flange is located in such slot. The effect of this is illustrated in FIGS. 5a to 5c. When the valve plate 40 is in its position of closure, the end portion 57 of each flange enters the slot 48 in the corresponding post 49, and the sleeve 24 is positioned, as illustrated in FIG. 5a such that the seal 25 engages the valve plate 40 and presses it against the opposite seal 35. Upon rotation of the ring 51 so as to bring the centre portion 56 of each flange into register with the slot 48 the sleeve 24 is withdrawn to the position illustrated in FIG. 5b, in which the seal 25 is retracted beyond the end of the duct section 20 adjacent to the gap 15, so that it is clear of the valve plate 40 and in consequence the latter is free to be moved to its open position as hereinafter described.

Continued rotation of the ring 51, which accompanies movement of the valve plate 40 to its open position causes the end portion 58 of the flange to enter the slot 48 when the valve plate reaches its fully open position. The sleeve 24 is thus moved in the direction away from the ring 51 until it reaches the position illustrated in FIG. 5c where the seal 25 engages the end plate 11 and the seal 35 engages the annular flange 23. As can be seen, in this condition, the duct is unobstructed and there is a double peripheral seal around the gap 15.

The valve plate 40 itself includes a main portion 41 of a size sufficient to obstruct the duct, and an extension portion 42. The extension portion 42 is keyed to an operating shaft 43 so that on rotation of the shaft about its longitudinal axis the valve plate 40 can swing from a position of closure in which it is centred on line 44 and an open position in which it is centred on line 45. The housing 30 may afford internal guides for the radially outermost portion of the valve plate 40 over its range of movement, as indicated at 46 in FIG. 3.

Movement of the valve plate between these positions, and movement of the ring 51 in co-ordination therewith is effected by means of an operating mechanism 60.

The operating mechanism 60 comprises an hydraulic or pneumatic ram 61 having a cylinder 62 which is pivotally mounted, as indicated at 63, on a support member 33 carried by the housing 30, and a piston rod 64 which is pivotally connected at its outer end to a generally triangular lever 65 which is keyed to the shaft 43 which carries the valve plate 40. The lever 65 carries a roller 66 which engages within a slot 67 formed in a plate 68 which is rigidly secured to the ring 51 so as to extend radially outwardly therefrom.

The arrangement is such that when the valve plate 40 is in its position of closure, the roller 66 is at the outer end of the slot 67 and the piston rod 64 is in its retracted position, all as shown in FIG. 3. When the ram 61 is actuated, the piston rod 64 moves outwardly so as to pivot lever 65 about the axis of shaft 43. Roller 66 thus follows an arcuate path whereby it runs to the inner end of the slot 67 and back to the outer end again whilst causing the plate 68 to travel in an anti-clockwise arc (as viewed in FIG. 3) centred on the centreline of the duct. In this way, the ring 51 is rotated by a corresponding angular amount, being that which corresponds to movement of the shaped flanges 55 through the slots 48.

At the same time, the valve plate 40, which is carried by the shaft 43, swings from its position of closure, centred on the line 44, to its fully open position, centred on the line 45.

The shaft 43 preferably also carries a counter-balance weight 69 and a cam plate 70 for the actuation of controlling micro-switches 71.

In order to allow a degree of movement to the ring 51 relative to the valve plate 40, so that continuing movement of the ring after the valve plate has reached its position of closure can cause clamping pressure to be exterted on the valve plate, the shaft 43 may be formed as two axially separate stub shafts which are connected together by means of a torsion spring. In this way, clamping pressure may be applied to, or released from, the valve plate whilst the latter is not subject to a force tending to move it laterally.

In the illustrated embodiment, the valve plate 40 is engaged by the seals 25 and 35 on both faces thereof when it is in its position of closure, so that upstream and downstream sections of the duct are sealed around the gap 15. However, under some circumstances, it may be sufficient to provide sealing engagement with only one face of the valve plate so that only the upstream or the donwstream section of the duct is positively sealed. In such a case, either the seal 25 or the seal 35 may be omitted. In a further alternative the, or each, seal could be mounted on the shutter plate 40 instead of on the frame members constituted by the end plate 11 and annular flange 23.

Whilst it is desirable for the housing 30 to comprise a sealed casing to prevent the escape of fluid or other fluent material from the system, whilst the shutter plate is being moved, in some cases it may not be necessary to provide a sealed casing. For example, if the valve is used in a pipeline conveying, for example, only air, such casing might be omitted entirely.

Whilst both the control mechanism 50 and the operating mechanism 60 are actuated my means of a single ram, it would alternatively be possible to employ separate actuating mechanisms, the operation of which is coordinated electrically or mechanically for example.

Whilst the embodiment of the invention illustrated in FIGS. 1 to 5 relates to a plate-type valve, in which the plate is movable between positions in which it intersects the duct sections and is laterally spaced therefrom, it will be appreciated that it may readily be modified to a valve of the goggle-type. In that case, the plate may be, for example, of semi-circular shape, having an aperture corresponding substantially to the internal dimensions of the sections 10 and 20, the plate then being movable between one position in which the aperture is in register with the sections, and another position in which the aperture is disposed wholly externally of the sections. The seals 25, 35 would then engage and clamp the valve plate in both its open and closed positions whilst being disengaged during movement of the valve plate from one position to the other. Such a modification is illustrated in FIG. 4A, the goggle-type valve plate being designated 40a.

It would also be possible to utilise a fully circular shutter plate having, for example, two diametrically opposed apertures and two sets of duct sections, in such a way that two separate, parallel ducts may be controlled simultaneously. Indeed, by arranging two apertures adjacent to one another, it would in this way be possible to set the valve plate in four different positions, one in which both ducts are closed, one in which a first duct is closed and a second duct is open, another in which the first duct is open and the second duct is closed, and a final position in which both ducts are open.

Whilst in the illustrated embodiment, the valve plate 40 is pivotable about the axis of shaft 43, it would also be possible to utilise a valve plate which is movable in a linear manner. Thus, a rectangular slide plate may be supported by means of a frame carrying four shafts which extend through apertures formed adjacent to the corners of the plate in such a manner as to allow limited axial movement.

Figure 6:
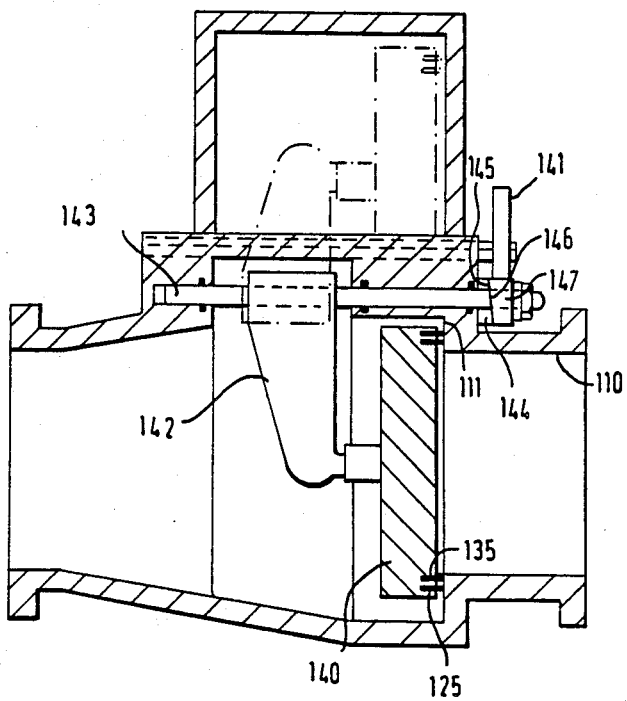
FIG. 6 shows a sectional view of a further embodiment of valve in accordance with the invention.

In the embodiments described above, the damper plate is allowed a limited amount of axial movement so that, whilst it is being moved between its open and closed positions, it is either out of contact with the sealing ring or rings entirely or at least in engagement therewith under no significant force. In the illustrated embodiment the movable frame member comprising annular flange 23 is responsible for the movement of the plate 40 against the outer seal 35. However, the invention may also be applied to valves of the type in which a plate is movable axially to engage an internal seating in the duct. In this case, as shown in FIG. 6, one or more resiliently mounted sealing rings 125, 135 which may be similar to the seals 25, 35 are provided around the peripheral margin of one face of an axially movable valve plate 140 and/or on the face of an opposing peripheral seating 111 provided in a duct section 110. In this way the axial movement which the plate is required to make is less critical. Lateral movement of the plate 140 into and out of the line of the duct is achieved by swinging the plate about an axis parallel with the axis of the duct and for this purpose the plate may be carried by a radial arm 142 mounted on a shaft 143 disposed outside the cross-section of the duct. The shaft 143 carries a collar 144 which is keyed thereto and affords an oblique face 145 which is engaged by a complementary oblique face 146 of a rotatable collar 147 spring-loaded into engagement therewith. In use the rotatable collar 147 is rotated by any suitable means such as an actuating lever 141 and the spring loading affords sufficient frictional contact with the collar 144 keyed to the shaft 143 so as to cause the shaft rotate and thereby swing the plate 140 into the line of the duct. By arranging an abutment so that lateral movement of the plate 140 is prevented when it is in register with the seating 111, further rotation of the rotatable collar 147 causes a camming action against the collar 144 thereby displacing the shaft 143 axially and bringing the plate 140 into sealing engagement with the seating 111.

The features disclosed in the foregoing description, or the accompanying drawings, expressed in their specific forms or in terms of a means for performing the disclosed function, or a method or process for attaining the disclosed result, may, separately or in any combination of such features, be utilised for realising the invention in diverse forms thereof.

What is claimed is:

1. A valve for controlling passage of a fluent medium, comprising:

a first duct section having an axis and an end;

a second duct section having an axis and an end, said second duct section being disposed so that its axis substantially coincides with said axis of said first duct section and so that its end is spaced apart from said end of said first duct section to provide a gap between said ends;

a rotatable shaft having an axis, said shaft being disposed outside said duct sections with its axis parallel to said axes of said duct sections;

a valve plate mounted on said shaft and perpendicular to said axis thereof, said plate being positioned to engage said gap;

a first annular flange affixed to said first duct section;

a sleeve slidably mounted around said second duct section, said sleeve having a second annular flange that faces said first annular flange;

an annular element rotatably disposed around said second duct section;

selectively operable means for rotating said annular element and said shaft in concert;

cam means operatively connecting said annular element and said sleeve for sliding said sleeve in a predetermined cycle when said annular element is rotated, said cycle including a first stage wherein said second flange is withdrawn from said gap as said valve plate rotates and a second state wherein said second flange is forced against said valve plate as said valve plate rests in said gap; and annular sealing means for resiliently sealing said valve plate to at least one of said flanges during said second stage of said predetermined cycle.

2. A valve according to claim 1, wherein said annular sealing means comprises a first annular resilient seal mounted on said first flange and a second annular resilient seal mounted on said second flange.

3. A valve according to claim 1, wherein said valve plate is a flat member having a solid portion that is disposed in said gap when said valve is closed and having an opening that is disposed in said gap when said valve is open.

4. A valve according to claim 1, wherein said valve plate is a flat member that is disposed in said gap when said valve is open and removed from said gap when said valve is closed.

5. A valve according to claim 4, wherein said predetermined cycle includes a third stage wherein said second flange is forced against said first flange when said valve is open, and wherein said sealing means comprises a first annular resilient seal mounted on said first annular flange and a second annular resilient seal mounted on said second annular flange, said annular seals having different diameters.

6. A valve according to claim 1, wherein said annular element has a slot, and wherein said selectively operable means comprises a lever member affixed to said shaft and slidably engaging said slot, and means for selectively rotating said lever member.

7. A valve according to claim 6, wherein said means for selectively rotating said lever comprises a ram and a piston rod connecting said ram to said lever member.

* * * * *